(12) United States Patent
Glynn

(10) Patent No.: US 7,146,243 B2
(45) Date of Patent: Dec. 5, 2006

(54) PRODUCT LOCATION METHOD UTILIZING PRODUCT BAR CODE AND AISLE-SITUATED, AISLE-IDENTIFYING BAR CODE

(75) Inventor: Kenneth P. Glynn, Raritan Township, Hunterdon County, NJ (US)

(73) Assignee: Lamson Holdings LLC, Wilmington, DE (US)

( * ) Notice: Subject to any disclaimer, the term of this patent is extended or adjusted under 35 U.S.C. 154(b) by 87 days.

(21) Appl. No.: 10/696,531

(22) Filed: Oct. 28, 2003

(65) Prior Publication Data

US 2005/0090931 A1    Apr. 28, 2005

(51) Int. Cl.
*G06F 7/00* (2006.01)
(52) U.S. Cl. ............. 700/215; 700/214; 700/225; 235/385
(58) Field of Classification Search ............. 700/215, 700/213, 214, 225; 235/385, 383, 462.01, 235/375
See application file for complete search history.

(56) References Cited

U.S. PATENT DOCUMENTS

| | | | | |
|---|---|---|---|---|
| 5,111,501 A | 5/1992 | Shimanuki | ............. | 379/355 |
| 5,136,634 A | 8/1992 | Rae et al. | ............. | 379/100 |
| 5,165,095 A | 11/1992 | Borcherding | ............. | 379/88 |
| 5,168,548 A | 12/1992 | Kaufman et al. | ............. | 395/2 |
| 5,172,314 A * | 12/1992 | Poland et al. | ............. | 705/1 |
| 5,222,121 A | 6/1993 | Shimada | ............. | 379/88 |
| 5,231,670 A | 7/1993 | Goldhor et al. | ............. | 381/43 |
| 5,239,586 A | 8/1993 | Marui | ............. | 381/47 |
| 5,301,227 A | 4/1994 | Kamei et al. | ............. | 379/88 |
| 5,335,276 A | 8/1994 | Thompson et al. | ............. | 380/21 |
| 5,349,636 A | 9/1994 | Irribarren | ............. | 379/89 |
| 5,383,111 A * | 1/1995 | Homma et al. | ............. | 705/27 |
| 5,406,618 A | 4/1995 | Knuth et al. | ............. | 379/67 |
| 5,493,107 A * | 2/1996 | Gupta et al. | ............. | 235/383 |
| 5,602,963 A | 2/1997 | Bissonnette et al. | ............. | 395/2.84 |
| 5,621,658 A | 4/1997 | Jackson et al. | ............. | 364/514 |
| 5,631,745 A | 5/1997 | Wong et al. | ............. | 358/434 |
| 5,671,328 A | 9/1997 | Fitzpatrick et al. | ............. | 395/2.55 |
| 5,821,513 A * | 10/1998 | O'Hagan et al. | ............. | 235/383 |
| 5,850,627 A | 12/1998 | Gould et al. | ............. | 704/231 |
| 6,269,342 B1 * | 7/2001 | Brick et al. | ............. | 705/20 |
| 6,497,367 B1 * | 12/2002 | Conzola et al. | ............. | 235/462.45 |
| 6,550,674 B1 * | 4/2003 | Neumark | ............. | 235/383 |
| 6,736,316 B1 * | 5/2004 | Neumark | ............. | 235/383 |
| 6,758,802 B1 * | 7/2004 | Fitzgerald et al. | ............. | 493/476 |
| 6,775,588 B1 * | 8/2004 | Peck | ............. | 700/214 |

* cited by examiner

*Primary Examiner*—Khoi H. Tran
(74) *Attorney, Agent, or Firm*—Kenneth P. Glynn, Esq.

(57) ABSTRACT

The present invention is an item location directory method and system which involves the use of item-identifying bar codes on the items to be included in the directory, and location-identifying bar codes physically applied to the corresponding locations. These are read in a preset manner with a bar code reader and inputted into a processor for creation of item/corresponding location data for the directories.

18 Claims, 3 Drawing Sheets

PRODUCT LOCATION METHOD UTILIZING PRODUCT BAR CODE AND AISLE-SITUATED, AISLE-IDENTIFYING BAR CODE

BACKGROUND OF THE INVENTION

1. Field of the Invention

The present invention relates to item locators, i.e. item directories, which direct a user such as a consumer or shopper, to a specific location to view, retrieve, order, purchase or otherwise use the information obtained in the system. Such directories may be in list or booklet form, in-computer-based form, e.g. retrievable or presenteable on screen, in print out, on-line, voice responsive or otherwise. These directories may be stationary, e.g. as a posted list; portable, as in a sheet or booklet form; audible, or in some other form, and may be activated as by some user action, e.g. pressing keys, speaking or otherwise. More specifically, the present invention includes a physical system and a method of collecting location data for directories and, in some embodiments, to actually create directories, which involves the use of product bar codes and location-situated, location-identifying bar codes. These are read and matched (coupled) and stored in a processor to provide location information to directory managers and subsequent users. Typically, the present invention could be used at retail stores to locate items to be purchased. Alternatively, it could be used at a production facility or distribution facility having a large number of parts, to locate specific parts for as needed. In other embodiments, it could be used in non-commercial entities, such as public libraries to locate a particular book.

2. Information Disclosure Statement

The state of the art for acquiring product location information involves the use of manually collected, inputted data. Bar codes have been used for years to identify products, but not to identify locations.

The following prior art patents represent various inventions relating to machines involving speech recognition for voice-based operation and thus illustrate known voice recognition applications:

U.S. Pat. No. 5,111,501 to Masanobu Shimanuki describes a telephone terminal device equipped with a transmitter microphone, a receiver, a speech recognition unit that receives and recognizes speech signals from the transmitter microphone and a circuit to reduce the level of signals send from a telephone network to the receiver when the speech recognition unit receives speech signals from the transmitter microphone. Further, this device is preferably equipped with a speech reproduction unit that reproduces the speech information stored in a memory, in response to the information of recognition result from the speech recognition unit, and a circuit that prevents transmission of signals from the telephone network to the receiver when the regenerated speech information is sent to the receiver. Furthermore, it is desirable for this device to be provided with a circuit that prevents generation of ringing tones when an incoming call arrives.

U.S. Pat. No. 5,136,634 to David C. Rae et al. describes voice operated facsimile machine network which includes a method and apparatus for transmitting specifically requested graphic and/or textual data from an unattended database storage location to a requestor's facsimile machine over a telephone line which includes a host computer such as a PC modified with a facsimile transmission board and a voice generation board. The host computer receives incoming phone calls and prompts the caller using the voice board to select data files by using the DTMF keys of a standard telephone handset. The PC can be left unattended and can run automatically in the facsimile transmission mode. Callers can immediately access needed textual and image data with the use of just a standard telephone and facsimile machine. Multiple workstation nodes can be configured in a network setup to handle a high volume of calls in real time and to allow multiple data services to operate simultaneously.

U.S. Pat. No. 5,165,095 to Mark A. Borcherding describes a method for dialing a telephone, using voice recognition to initiate the dialing and to determine the correct telephone number. The dialing is initiated with a spoken dial command that is recognized by using speaker independent templates that are stored locally with respect to the caller's telephone. The correct telephone number is recognized by using speaker dependent template that are downloaded from a central database or by using speaker independent templates stored locally.

U.S. Pat. No. 5,168,548 to Steven Kaufman et al. describes a reporting system which is disclosed herein, a speech recognizer which is used to select selections of text from a report form stored in a computer and to insert recognized terms in the text thereby to generate a report text under voice control. A command interpreter, also responsive to spoken words, initiates creation of the report text and its subsequent storing, printing and transmission. The command processor is responsive to respective spoken commands to select a destination telephone number and to cause the report text to be sent to apparatus for converting report text to image data and for modulating an audio band signal with the image data for facsimile transmission over telephone lines.

U.S. Pat. No. 5,222,121 to Keiko Shimada describes a voice recognition dialing unit of a telephone mounted on a vehicle or similar mobile body and which allows a call to be originated with ease. When the user of the telephone enters a voice command on voice inputting section, the dialing unit originates a call automatically and thereby connects the other party to the telephone line. In a call origination procedure, the operations for call origination and the verifications are performed between the user and the unit in an interactive sequence. In a preferred embodiment, the unit has a particular call origination procedure in which, when the other party recognized by the unit is wrong as determined by the user by verification, lower place candidates for the other party are called up in response to a particular voice command. In an alternative embodiment, the unit indicates the other party by voicing a name for verification purpose. The alternative embodiment selects and stores only the name of the other party in response to an entered voice signal and, in the event of response for verification, combines the name having been stored and response information stored beforehand to produce composite response voice.

U.S. Pat. No. 5,231,670 to Richard S. Goldhor et al. describes a system and method for generating text from a voice input that divides the processing of each speech event into a dictation event and a text event. Each dictation event handles the processing of data relating to the input into the system, and each text event deals with the generation of text from the inputted voice signals. In order to easily distinguish the dictation events from each other and text events from each other the system and method creates a data structure for storing certain information relating to each individual event. Such data structures enable the system and method to process both simple spoken words as well as spoken commands and to provide the necessary text generation in response to the spoken words or to execute an appropriate function in response to a command. Speech recognition includes the ability to distinguish between dictation text and commands.

U.S. Pat. No. 5,239,586 to Kuniyoshi Marui describes a voice recognition system which comprises a handset and a hands-free microphone for generating an input audio signal, a high-pass filter for eliminating low frequency components from the signal from the handset or hands-free microphone, a signal lever controller for adjusting the level of the high-pass signal in response to the user of either the handset or hands-free microphone, a storer for storing the speech data and a controller for controlling the storer so that a user's utterance is stored or the user's utterance is recognized by comparing the utterance to speech data already stored. The handset hook switch provides an on-hook control signal to reduce amplifier gain during hands-free microphone operation.

U.S. Pat. No. 5,301,227 to Shoichi Kamei et al. describes an automatic dial telephone that is useable in a motor vehicle, when a voice input is provided during a period in which input of the names of called parties is awaited, a voice pattern of the name of the called party is compared with reference patterns of called parties stored in reference patterns storing device, to determine the degree of the similarity therebetween. The names of the called parties are output to a user in the order of decreasing degree of similarity. Each time the name of a called party is output, a command word for confirmation is a waited from a user for a predetermined time period. When a voice confirmation command is input and is recognized during this waiting period, a telephone number corresponding to the name of the called party is supplied to a channel. Consequently, the command word for confirmation may be input only if the name of the called party outputted is one desired by the user. Sensors continually monitor the driving condition of the motor vehicle in which the telephone is installed. When the operation of the steering wheel or brakes of the motor vehicle exceeds a predetermined threshold or the speed of the motor vehicle is excessive, the sensors generate safety signals that inhibit the operation of the telephone.

U.S. Pat. No. 5,335,276 to E. Earle Thompson et al. describes a communication system which is provided with multiple purpose personal communication devices. Each communication device includes a touch-sensitive visual display to communicate text and graphic information to and from the user and for operating the communication device. Voice activation and voice control capabilities are included within communication devices to perform the same functions as the touch-sensitive visual display. The communication device includes a built-in modem, audio input and output, telephone jacks and wireless communication. A plurality of application modules are used with personal communication devices to perform a wide variety of communication functions such as information retrievable, on-line data base services, electronic and voice mail. Communication devices and application modules cooperate to allow integrating multiple functions such as real time communication, information storage and processing, specialized information services, and remote control of other equipment into an intuitively user friendly apparatus. The system includes both desktop and hand-held communication devices with the same full range of communication capabilities provided in each type of communication device.

U.S. Pat. No. 5,349,636 to Roberto Irribarren describes a communication system for verbal telephonic communication which has a voice message system for storing and retrieving voice messages integrated with a computer database accessing system for storing and retrieving text messages from a separate computer system and for converting the text messages into voice. The systems are integrated via a network which coordinates the functions of each individual system. Additionally, the input/output ports of the voice message system and the computer database accessing system are connected in a parallel fashion to at least one telephone line. In this configuration a user may access both voice messages and database information, including text or electronic mail messages, with a single telephone call. Optionally, facsimile messages can be stored, retrieved and manipulated with a single telephone call.

U.S. Pat. No. 5,406,618 to Stephen B. Knuth et al. describes a telephone answering device that is activated by a proximity sensor when a user crosses its field of detection and whose operation is controlled by simple voice commands. The device incorporates speaker-independent voice recognition circuitry to respond to spoken commands of the user that are elicited by a system generated voice request menu. The telephone answering device performs all the basic functions of a telephone answering machine in response to these simple commands and there is no need for the user to manually operate the telephone answering device.

U.S. Pat. No. 5,602,963 to W. Michael Bissonnette et al. describes a small, portable, hand-held electronic personal organizer which performs voice recognition on words spoken by a user to input data into the organizer and records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of different functions, including voice training, memo record, reminder, manual reminder, timer setting, message review, waiting message, calendar, phone group select, number retrieval, add phone number, security and "no" logic. During such various functions, data is principally entered by voice and occasionally through use of a limited keypad, and voice recordings are made and played back as appropriate. A visual display provides feedback to the user. During the various function, the user can edit various different data within the organizer by eliminating or correcting such data or entering new data.

U.S. Pat. No. 5,621,658 to Brion K. Jackson describes an action contained within an electronic mail object which is communicated from a data processing system to another data processing system via an audio device. The action is executable on a data processing system. At the sending data processing system, the action is converted to a predetermined audio pattern. The electronic mail object may contain text in addition to an action. The text is also converted to an audio pattern. The audio patterns are then communicated to the audio device over telephone lines or other communication medium. At the receiving end, the audio device records the object. A user can provide the recorded object to a data processing system, which then executes the action and converts the text audio patterns back to text. In addition, the action can be converted to text and displayed on the data processing system.

U.S. Pat. No. 5,631,745 to John J. Wong et al. describes a telephone terminal adapted for business or home use that includes the ability to receive and send facsimiles, a voice answering function and a computer modem. Various input and output devices may be used for the facsimile function.

A voice annotated facsimile may be sent and received. At the same time the facsimile is viewed on a video monitor or ordinary television set, an accompanying voice message is heard through the sound system of the monitor or television set. The terminal has an architecture including a central processor and an internal bus structure to which several types of memory, various input-output devices and an interface with the telephone line are connected, among others. Audio Random Access Memory (ARAM) is used for storing both facsimile data and voice data.

U.S. Pat. No. 5,671,328 to Gregory P. Fitzpatrick et al. describes a method and data processing system which are disclosed for automatically creating voice processing template entries. In one embodiment, the invention automatically assembles a plurality of commands received by the data processing system, at least one of said commands having a voice recognition criteria component associated therewith, counts the occurrences of the plurality of commands, assembles voice recognition criteria components associated with the plurality of commands, and, as a result of the occurrence count exceeding a predefined minimum, constructs a voice recognition template entry by associating the assembled voice recognition criteria components with the assembled plurality of commands.

U.S. Pat. No. 5,850,627 to Joel M. Gould et al. describes a word recognition system which can: respond to the input of a character string from a user by limiting the words it will recognize to words having a related, but not necessarily the same, string; score signals generated after a user has been prompted to generate a given word against words other than the prompted word to determine if the signal should be used to train the prompted word; vary the number of signals a user is prompted to generate to train a given word as a function of how well the training signals score against each other or prior models for the prompted word; create a new acoustic model of a phrase by concatenating prior acoustic models of the words in the phrase; obtain information from another program running on the same computer, such as its commands or the context of text being entered into it, and use that information to vary which words it can recognize; determine which program unit, such as an application program or dialog box, currently has input focus on its computer and create a vocabulary state associated with that program unit into which vocabulary words which will be made active when that program group has the focus can be put; detect the available computational resources and alter the instructions it executes in response; test if its ability to respond to voice input has been shut off without user confirmation, and, if so, turn that ability back on and prompt the user to confirm if that ability is to be turned off; store both a first and a second set of models for individual vocabulary words and enable a user to selectively cause the recognizer to disregard the second set of models for a selected word; and/or score a signal representing a given word against models for that word from different word model sets to select which model should be used for future recognition.

Notwithstanding the prior art, the present invention is neither taught nor rendered obvious thereby.

SUMMARY OF THE INVENTION

The present invention is directed to a method of creating data for directories for locating items so that the directories are efficiently loaded with location data both prior to use by the customers or other users, as well as, in some preferred embodiments, so that the directories may be updated as desired while in use. This method involves utilization of bar codes to determine item identity, and the use of separate bar codes to determine locations. These separate location-identifying bar codes are physically located on location structure, e.g. on aisle ends, shelf edges, bin walls, parking spaces, etc. This location data is read in conjunction with item identification data by bar code readers, fed to a processor in a recognizable combined format, and then stored and used as the resource data of the directory and/or becomes the directory itself. One the item/corresponding location data is created, it may be used to print out or publish directories, it may become available by wireless service, by internet, or be screen presentable or retrievable, as in the case of keyboard/monitor type directories, or any combination of the foregoing.

For example, a supermarket could assign unique bar codes to each aisle, create bar code labels and attach them to the ends of each aisle, and then program the system according to the following simple process:

a) The processor will be programmed to read and identify products by the universal price code ("UPC") inputs form a bar code reader, and will likewise be programmed to recognize and identify locations by bar code inputs from a bar code reader, that is, the processor will be programmed to understand the codes created for particular locations to be included in the supermarket product location system;

b) The processor will also be programmed to match items (products) to locations when read between identical location readings. In other words, when a reader inputs a location bar code from one end of an aisle, and then reads all of the UPCs of all items in the aisle, and then reads the same location bar code at the other end of the same aisle, this tells the processor to create a matching set of pairs of products and locations for all products read between each end of that aisle. In an alternative embodiment, each type of item could be read before or after the location reading to create location data pairings. The created, stored data may then be used for the directory or directories in any desirable manner and form, including those described above.

A locator system having these directories may be a stand alone device, but in many embodiments would be part of an internal connected system. It could be an intranet or secured internet system, but would in many cases be a storewide system with a plurality of user locations (units, phones, or microphones with feedback at each location). The system could merely be a set of print outs at various locations around the store or other facility, or could be one or more keyboard/monitor sets where a customer would type in the desired item (product), or the system could be more significant and include voice activation and/or voice recognition and/or voice response. These more sophisticated systems could include an embedded voice-driven interface for speech control of: (1) operational instructions; (2) core system locator function operations, that is, recognition of specific requests and responses thereto; and, (3) optional and default functions. Thus, the system utilizing the present invention method could include a device which is both operated by speech (speech or voice activated) and speech responsive (voice answers and instructions to the user from the system). Thus, the system may rely upon automatic speech recognition (ASR), either in place of or in addition to manual locator systems, e.g. book, list, map and computer directories.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention is a method and system for creating data for item location directories. By "item" is meant a place or thing that a user desires to locate. Thus, a item could be a particular brand of canned string beans, a type of outdoor stain, a booth at a convention, a particular part in inventory for sale, assemblage or distribution, a particular automobile in a production facility lot or in a large parking garage, or a room, a functional group or a person's desk in an office building or the like. The "location" may be in the form of a word or sentence presented visually or audibly and/or it may designate an aisle, a shelf, a bin number, a rom number, a row and slot or space, etc.

An important aspect of the present invention is the system of software and hardware (equipment) to utilize the present invention method of creating item location information for directories. It involves using item-identifying bar codes on items to be included and using location-identifying bar codes from corresponding locations. The location-identifying bar codes are physically situated on the locations themselves. For example, they are located on aisle ends, shelves, bins, drawers, floor area grids, etc.

The location-identifying bar codes may be custom created for the locations or may be established as a universal location system. Alternatively, a manager could use existing UPC bar codes for the locations, provided that they were different from the items to be located, and provided that the system were programmed to correlate these particular codes to specified locations.

The item-identifying bar codes are typically located on the items themselves, but when more than one identical item is included, a single item of the set of identical items will be sufficient for the method to work. However, it is preferred that all items in each set have the bar code located thereon. In some preferred embodiments, the bar codes for the items are Universal Price Code (UPC) bar codes, but the present invention need not be limited thereto, such as when it would be more appropriate to create unique identifying codes for each and every item, such as automobiles, artwork, etc.

The essential features of the present invention system include the item-identifying bar codes, the location-identifying bar codes, the items and their locations, at least one bar code reader and at least one processor.

Figure 1:
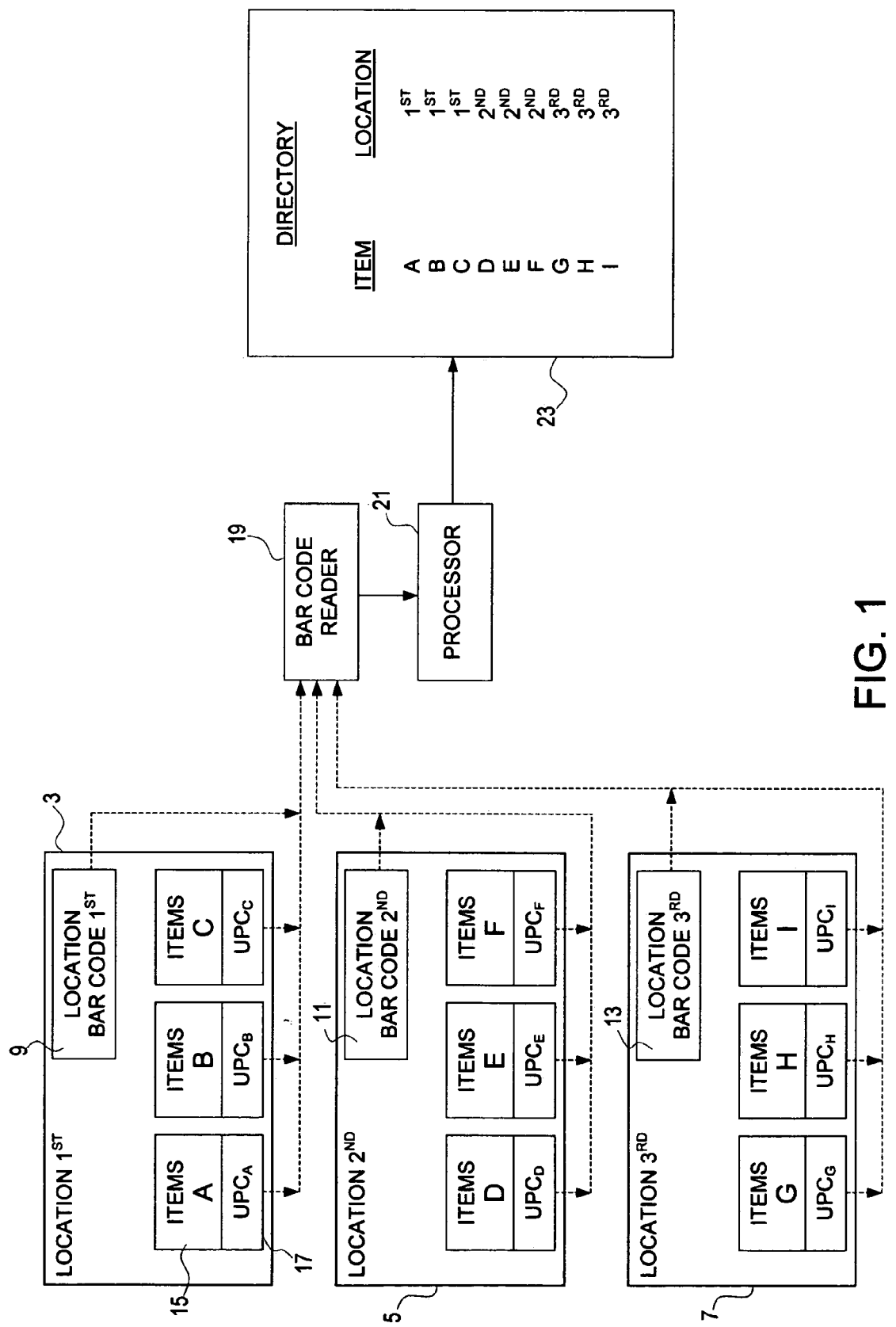
FIG. 1 illustrates a block diagram showing the system and method of creating a directory in accordance with the present invention; and, FIGS. 2a and 2b show a general schematic diagram showing software and functional features of a present invention method and its incorporation into a voice-based item locator system, including the present invention method of creating item/location data pairs.

FIG. 1 illustrates the present invention in block diagram, showing a preferred embodiment of the method and system of creating a directory. In this embodiment, a plurality of identical items comprise a set, and there are a plurality of such sets. Thus, there are a number of sets of items at a specific location, and a plurality of such locations. This model could be a department store, a grocery store, a hardware store, etc. As shown in the Figure, there are three different locations and each has three different sets of items. Location First 3 has Items A, B and C; Location Second 5 has Items D, E and F; Location Third 7 has Items G, H and I. Location First has its own unique identifying bar code 9; Location second has its own unique identifying bar code 11 and Location Third has its own unique identifying bar code 13. Likewise, Items A through I each have there own unique product identifying bar codes, and, in this case, Universal Price Codes (UPCs). Representative is Item A shown as item 15 with its own UPC 17. Bar code reader 19 is used to read the location bar codes and product bar codes in a manner consistent with a program-required sequence (i.e. the sequence must conform to what the software has been programmed to expect, such as, first reading is product, second reading is corresponding location). The readings are processed to convert optical readings to digital and the digital data may be used to create hard copy, such as directory 23 shown, or screen presentation, or audio, or voice activated, or combinations of offerings for directory access.

Figure 2A:
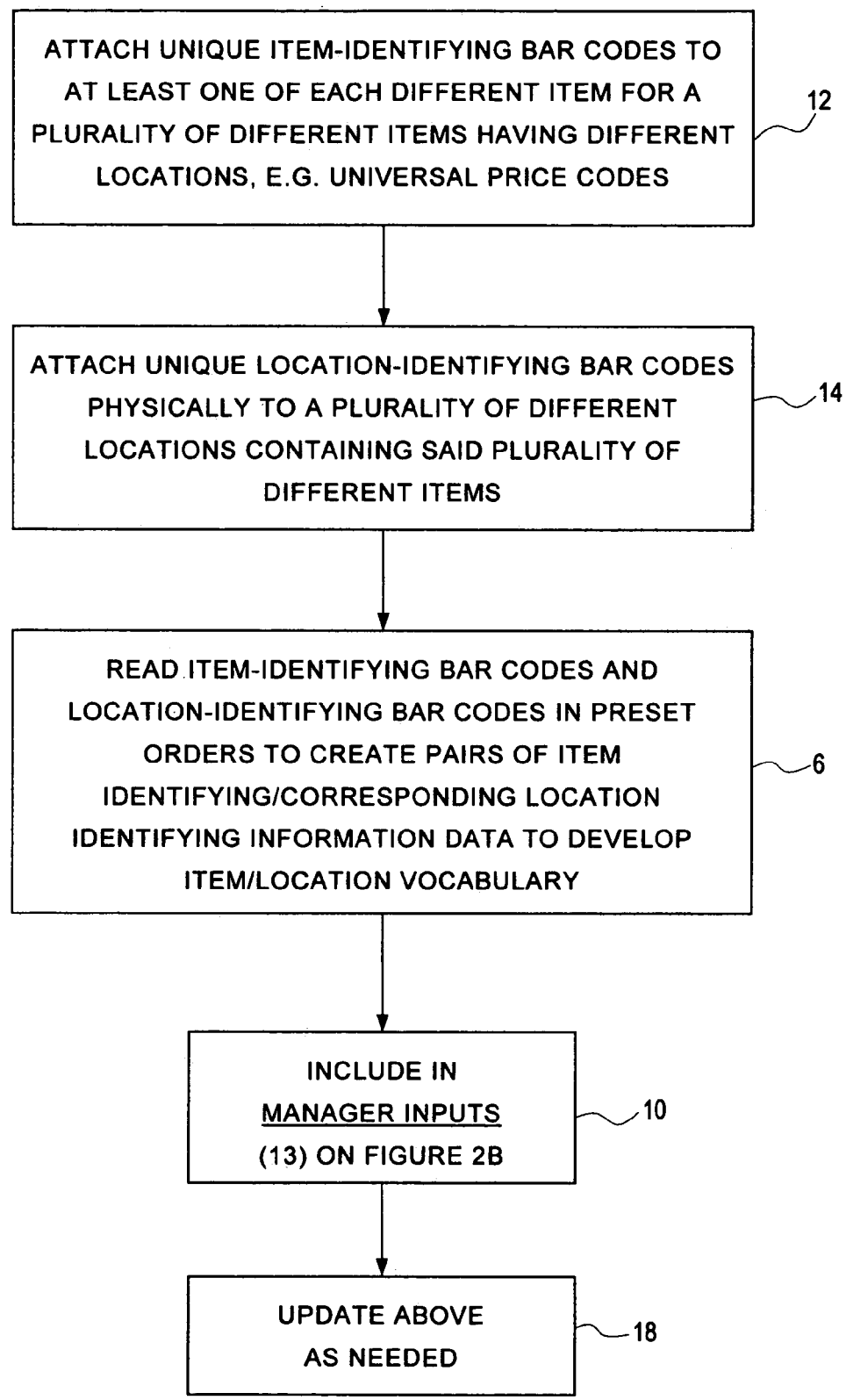
Figure 2B:
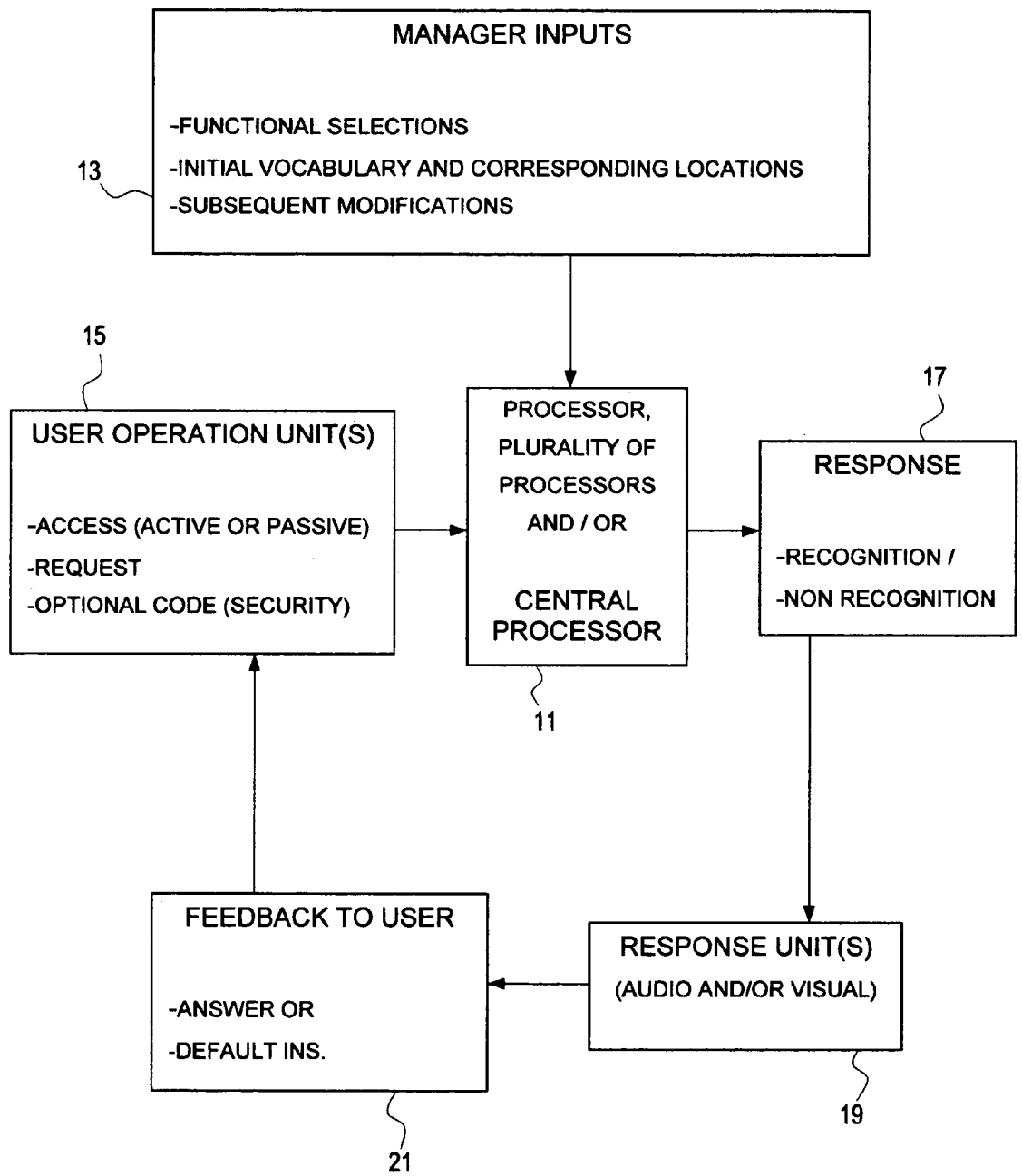

FIGS. 2a and 2b show a general schematic diagram of a present invention method and its integration into a voice-based directory system, showing general software features and functional features. Thus, the present invention includes a method, and a system with the software and hardware for the creation of item/location data pairs, as described above.

In FIG. 2a, the basic aspects of the item/location information data creation method are set forth in schematic form. The unique item-identifying bar codes are attached 12 to at least one of each different item for a plurality of sets of items, each set having items different from the items in the other sets. Likewise, unique location-identifying bar codes are attached 14 to the corresponding locations, and, subsequently, they are read 16 in predetermined manner so that the program recognizes sequences and creates data pairs to develop the item/location vocabulary for the system. This information is included in manager inputs 10 (referenced also in FIG. 2b as inputs 13). The method shown in FIG. 2a is repeated as needed for updating 18.

FIG. 2b illustrates features of the overall item locator system in which the present invention system and method are used, and includes a central processor 11 which may be an external or internal component, i.e., within a single unit or at a separate location from audio receivers and transmitters, e.g., microphones/speakers for user inputs and feedback to users.

The system may be preprogrammed with the user being required to follow concise instructions for activation and operation, or may be programmable to alter, add or enhance ease or methods of use, e.g. through a limited access code, for manager inputs 13 of user instructions. In any event, manager inputs 13 shall include functional selections and inputs of items and their locations, with provision for subsequent access for modifications. This programming may include direct keyboard, voice, etc., and, as mentioned, may include security capabilities for preventing unauthorized use, e.g. voice identification (user recognition) or user security code system, as well as other options which may be included therein, such as a "help" detailed manager instruction section.

Once the system has been programmed for use, the user operation unit(s) 15 provide functional access, which may be passive, i.e., the user speaks, picks up a phone, presses a button, or otherwise takes some action to activate the system; or it may be active, i.e., a proximity sensor, a periodicity timer, or other internal mechanism may automatically activate the system and could trigger an audio or visual query, such as "May I help you locate a product?"

Once the system has been activated and a user has stated the necessary words of input to activate the device, recognition/non-recognition response 17 results from processing the user inputs to central processor 11, and audio and/or video response unit(s) 19 provide feedback 21 to the user, either by answering the inquiry, conditionally defaulting, e.g., asking for a repeat or a restate the question, or fully defaulting, e.g. directing the user to a courtesy desk or check out counter for additional assistance.

Obviously, numerous modifications and variations of the present invention are possible in light of the above teachings. It is therefore understood that within the scope of the appended claims, the invention may be practiced otherwise than as specifically described herein.

What is claimed is:

1. A system for creating an item location directory to locate one or more specific items, which consists of:
   a.) a plurality of sets of different items, each set having at least one item therein, each set having a specified location, and each set having a unique item-identifying bar code, with at least one item of each set having said unique item-identifying bar code located thereon;
   b.) a plurality of specified locations, each location having at least one of said plurality of sets of different items located thereat, each location of said plurality of locations having one unique location-identifying bar code, each of said plurality of locations having said unique location-identifying bar code physically situated thereon, wherein said unique location-identifying bar code is a bar code which includes code for genus data and for species data;
   c.) at least one bar code reader for reading said item-identifying bar codes and said location-identifying bar codes;
   d.) at least one processor adapted to receive inputs from said at least one bar code reader;
   e.) sufficient programming within said processor to provide recognition, organization, storage and presentation of item-identification/corresponding location-identification data pairs obtained from said item-identifying bar codes and said location-identifying bar codes, so as to create an item location directory therefrom wherein said unique item-identifying bar code is a universal price code bar code.

2. The system of claim 1 wherein said genus data is row or aisle data, and said species data is bin, drawer or shelf data.

3. The system of claim 1 wherein said programming includes software which receives bar code reader inputs and converts said received inputs to item-identification/corresponding location-identification data pairs for location information.

4. The system of claim 1 wherein said location-identifying bar codes are universal price code bar codes.

5. The system of claim 1 wherein said location-identifying bar codes are universal price code bar codes assigned to specific locations and are different from all item-identifying bar codes contained within the system, and wherein said processor is programmed to correlate said location-identifying bar codes to their assigned locations.

6. The system of claim 1 wherein said location-identifying bar codes are universal price code bar codes assigned to specific locations that are different from all item-identifying bar codes contained within the system, and wherein processor is programmed to correlate said location-identifying bar codes to their assigned locations.

7. A system for creating an item location directory to locate one or more specific items, which consists of:
   a.) a plurality of sets of different items, each set having at least one item therein, each set having a specified location, and each set having a unique item-identifying bar code, with at least one item of each set having said unique item-identifying bar code located thereon;
   b.) a plurality of specified locations, each location having at least one of said plurality of sets of different items located thereat, each location of said plurality of locations having one unique location-identifying bar code, each of said plurality of locations having said unique location-identifying bar code physically situated thereon, wherein said unique location-identifying bar code is a bar code which includes code for genus data and for species data;
   c.) at least one bar code reader for reading said item-identifying bar codes and said location-identifying bar codes;
   d.) at least one processor adapted to receive inputs from said at least one bar code reader;
   e.) sufficient programming within said processor to provide recognition, organization, storage and presentation of item-identification/corresponding location-identification data pairs obtained from said item-identifying bar codes and said location-identifying bar codes, so as to create an item location directory therefrom wherein said unique item-identifying bar code is a universal price code bar code;
   f.) a user feedback unit which includes visual display means for viewing visual feedback in the form of text, or map or a combination thereof.

8. The system of claim 7 wherein said genus data is row or aisle data, and said species data is bin, drawer or shelf data.

9. The system of claim 7 wherein said programming includes software which receives bar code reader inputs and converts said received inputs to item-identification/corresponding location-identification data pairs for location information.

10. The system of claim 7 wherein said location-identifying bar codes are universal price code bar codes.

11. The system of claim 7 wherein said location-identifying bar codes are universal price code bar codes assigned to specific locations and are different from all item-identifying bar codes contained within the system, and wherein said processor is programmed to correlate said location-identifying bar codes to their assigned locations.

12. The system of claim 7 wherein said location-identifying bar codes are universal price code bar codes assigned to specific locations that are different from all item-identifying bar codes contained within the system, and wherein processor is programmed to correlate said location-identifying bar codes to their assigned locations.

13. A system for creating an item location directory to locate one or more specific items, which consists of:
   a.) a plurality of sets of different items, each set having at least one item therein, each set having a specified location, and each set having a unique item-identifying bar code, with at least one item of each set having said unique item-identifying bar code located thereon;

b.) a plurality of specified locations, each location having at least one of said plurality of sets of different items located thereat, each location of said plurality of locations having one unique location-identifying bar code, each of said plurality of locations having said unique location-identifying bar code physically situated thereon, wherein said unique location-identifying bar code is a bar code which includes code for genus data and for species data;

c.) at least one bar code reader for reading said item-identifying bar codes and said location-identifying bar codes;

d.) at least one processor adapted to receive inputs from said at least one bar code reader;

e.) sufficient programming within said processor to provide recognition, organization, storage and presentation of item-identification/corresponding location-identification data pairs obtained from said item-identifying bar codes and said location-identifying bar codes, so as to create an item location directory therefrom wherein said unique item-identifying bar code is a universal price code bar code;

f.) at least one directory selected from the group consisting of printed directory, on-screen directory, on-line directory, audible directory and combinations thereof.

14. The system of claim 13 wherein said genus data is row or aisle data, and said species data is bin, drawer or shelf data.

15. The system of claim 13 wherein said programming includes software which receives bar code reader inputs and converts said received inputs to item-identification/corresponding location-identification data pairs for location information.

16. The system of claim 13 wherein said location-identifying bar codes are universal price code bar codes.

17. The system of claim 13 wherein said location-identifying bar codes are universal price code bar codes assigned to specific locations and are different from all item-identifying bar codes contained within the system, and wherein said processor is programmed to correlate said location-identifying bar codes to their assigned locations.

18. The system of claim 13 wherein said location-identifying bar codes are universal price code bar codes assigned to specific locations that are different from all item-identifying bar codes contained within the system, and wherein processor is programmed to correlate said location-identifying bar codes to their assigned locations.

* * * * *

UNITED STATES PATENT AND TRADEMARK OFFICE
CERTIFICATE OF CORRECTION

PATENT NO.         : 7,146,243 B2
APPLICATION NO. : 10/696531
DATED              : December 5, 2006
INVENTOR(S)        : Kenneth P. Glynn et al.

It is certified that error appears in the above-identified patent and that said Letters Patent is hereby corrected as shown below:

At column 10, line 1, following the word "wherein" add --said--.

At column 10, line 58, following the word "wherein" add --said--.

At column 12, line 21, following the word "wherein" add --said--.

Signed and Sealed this

Sixteenth Day of September, 2008

JON W. DUDAS
*Director of the United States Patent and Trademark Office*